(12) United States Patent
Okura et al.

(10) Patent No.: US 11,263,408 B2
(45) Date of Patent: Mar. 1, 2022

(54) ALIGNMENT GENERATION DEVICE AND ALIGNMENT GENERATION METHOD

(71) Applicant: FUJITSU LIMITED, Kawasaki (JP)

(72) Inventors: Seiji Okura, Meguro (JP); Masao Ideuchi, Hachioji (JP); Masahiro Kataoka, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 16/296,257

(22) Filed: Mar. 8, 2019

(65) Prior Publication Data
US 2019/0286709 A1    Sep. 19, 2019

(30) Foreign Application Priority Data
Mar. 13, 2018    (JP) .............................. JP2018-044972

(51) Int. Cl.
G06F 40/30    (2020.01)
G06F 40/58    (2020.01)
(Continued)

(52) U.S. Cl.
CPC ............ *G06F 40/45* (2020.01); *G06F 40/211* (2020.01); *G06F 40/268* (2020.01); *G06F 40/284* (2020.01); *G06F 40/58* (2020.01)

(58) Field of Classification Search
CPC ......... G06F 40/58; G06F 40/44; G06F 40/45; G06F 40/47; G06F 40/268; G06F 40/284; G06F 40/30
See application file for complete search history.

(56) References Cited

U.S. PATENT DOCUMENTS 5,724,593 A * 3/1998 Hargrave, III .......... G06F 40/45
                                                    704/7
5,768,603 A * 6/1998 Brown .................... G06F 40/44
                                                    704/9
(Continued)

FOREIGN PATENT DOCUMENTS

JP    2013-117888 A    6/2013
JP    2013-196106 A    9/2013
(Continued)

OTHER PUBLICATIONS

Sun et al., Cross-lingual Entity Alignment via Joint Attribute-Preserving, Embedding, 2017, arXiv:1708.05045v2, pp. 1-16. (Year: 2017).*

(Continued)

Primary Examiner — Lamont M Spooner
(74) Attorney, Agent, or Firm — Xsensus LLP

(57) ABSTRACT

A computer generates a plurality of encoded sentences in the first language by encoding a plurality of sentences in the first language in prescribed units. Next, the computer generates a plurality of encoded sentences in the second language by encoding a plurality of sentences in the second language, each of which is associated with each of the plurality of sentences in the first language, in the prescribed units. The computer generates alignment information based on a code included in each of the plurality of encoded sentences in the first language and a code included in an encoded sentence in the second language, which is associated with each of the plurality of encoded sentences in the first language. The alignment information indicates an alignment between a plurality of codes in the first language and a plurality of codes in the second language.

13 Claims, 23 Drawing Sheets

(51) Int. Cl.
*G06F 40/45* (2020.01)
*G06F 40/211* (2020.01)
*G06F 40/268* (2020.01)
*G06F 40/284* (2020.01)

(56) References Cited

U.S. PATENT DOCUMENTS

| | | | | |
|---|---|---|---|---|
| 5,850,561 | A * | 12/1998 | Church | G06F 40/247 715/234 |
| 7,822,597 | B2 * | 10/2010 | Brun | G06F 40/284 704/9 |
| 8,874,427 | B2 * | 10/2014 | Ross | G06F 16/90344 704/2 |
| 9,384,267 | B2 * | 7/2016 | Choi | G06F 16/951 |
| 9,916,305 | B1 * | 3/2018 | Ayan | H04L 51/063 |
| 10,061,768 | B2 * | 8/2018 | Su | G06F 40/45 |
| 10,672,391 | B2 * | 6/2020 | Maergner | G10L 15/26 |
| 2003/0040900 | A1 * | 2/2003 | D'Agostini | G06F 40/47 704/2 |
| 2004/0030551 | A1 * | 2/2004 | Marcu | G06F 40/45 704/240 |
| 2004/0261021 | A1 * | 12/2004 | Mittal | G06F 3/0237 715/256 |
| 2005/0108630 | A1 * | 5/2005 | Wasson | G06F 16/313 715/230 |
| 2006/0287847 | A1 * | 12/2006 | Moore | G06F 40/45 704/8 |
| 2006/0293880 | A1 * | 12/2006 | Elshishiny | G06F 16/374 704/10 |
| 2008/0120092 | A1 * | 5/2008 | Moore | G06F 40/45 704/4 |
| 2009/0063126 | A1 * | 3/2009 | Itagaki | G06F 40/44 704/2 |
| 2009/0083023 | A1 * | 3/2009 | Foster | G06F 40/45 704/3 |
| 2010/0057439 | A1 * | 3/2010 | Ideuchi | G06F 40/42 704/7 |
| 2010/0070261 | A1 * | 3/2010 | Jin | G06F 40/45 704/2 |
| 2011/0202334 | A1 * | 8/2011 | Abir | G06F 40/55 704/4 |
| 2011/0295589 | A1 * | 12/2011 | Brockett | G06F 40/289 704/4 |
| 2014/0164352 | A1 * | 6/2014 | Denninghoff | H03H 9/25 707/711 |
| 2014/0172407 | A1 * | 6/2014 | Eden | G06F 40/42 704/2 |
| 2015/0051896 | A1 * | 2/2015 | Simard | G06F 40/58 704/2 |
| 2015/0057994 | A1 * | 2/2015 | Fang | G06F 40/242 704/4 |
| 2015/0248401 | A1 * | 9/2015 | Ruvini | G06F 40/58 704/2 |
| 2016/0092437 | A1 | 3/2016 | Endo et al. | |
| 2016/0350329 | A1 * | 12/2016 | Resch | G06F 3/0644 |
| 2017/0132213 | A1 * | 5/2017 | Byron | G06F 40/58 |
| 2017/0212890 | A1 * | 7/2017 | Akbik | G06F 40/30 |
| 2018/0189630 | A1 * | 7/2018 | Boguraev | G06F 16/3344 |
| 2018/0285352 | A1 * | 10/2018 | Ma | G06F 40/42 |
| 2019/0129947 | A1 * | 5/2019 | Shin | G06N 3/0445 |
| 2019/0265955 | A1 * | 8/2019 | Wolf | G06N 3/084 |
| 2020/0302127 | A1 * | 9/2020 | Liu | G06N 3/0445 |

FOREIGN PATENT DOCUMENTS

| | | |
|---|---|---|
| JP | 2015-022431 A | 2/2015 |
| JP | 2016-071439 A | 5/2016 |

OTHER PUBLICATIONS

Kalchbrenner et al., "Recurrent Continuous Translation Models", Proceedings of the 2013 Conference on Empirical Methods in Natural Language Processing, Seattle, Washington, USA, Oct. 18-21, 2013, pp. 1700-1709.

Brown et al., "The Mathematics of Statistical Machine Translation: Parameter Estimation", Computational Linguistics, vol. 19, No. 2, 1993, pp. 263-311.

Yuta Kikuchi, "Deep Learning, Recurrent Neural Network Language Model", Dec. 9, 2013, 25 pages.

* cited by examiner

FIG. 5

501: 
4. ^ "QFS Compression". Niotso Wiki. http://wiki.niotso.org/QFS_compression. Retrieved 2011-11-06.
5. ^ Feldspar, Antaeus (August 23, 1997). "An Explanation of the Deflate Algorithm" comp.compression. zlib.net. http://www.zlib.net/feldspar.html Retrieved 2011-06-30

502:
- Id
- par
- An
- us (
- August 2
- 3,
- ).
- An
- pla
- nation
- of the
- lat
- Algorithm
- ".
- comp 503:
- compression.
- .z
- zli
- ib
- b.
- .n
- net
- t.
- htt
- tp://
- /www
- w.
- .z
- zlib
- b.n

| 1001 | we | hope | that | this | manual | is | of | help | to | all | users | . |
|---|---|---|---|---|---|---|---|---|---|---|---|---|
| 1002 | contents | and | use | of | this | manual | | | | | | |

F I G. 1 0 A

| 1011 | honsho | ga | minasama | no | o | yaku | ni | ta | tsu | koto | wo | nega | tsute | o | ri | ma | su | . |
|---|---|---|---|---|---|---|---|---|---|---|---|---|---|---|---|---|---|---|
| 1012 | honsho | no | naiyou | to | tsukai | kata | | | | | | | (DOUBLE CONSONANT) | | | | | |

F I G. 1 0 B

| 1012 | honsho | no | naiyou | to | tsuka | i | kata |

| 1112 | 0xF350 | 0xF3 | 0xE2 | 0xAF | 0xCC | | 0xBF |

| | 1 | 2 | 3 | 4 | 5 | 6 | 7 |
|---|---|---|---|---|---|---|---|
| 1112 | 0xF350 | | 0xF3 | 0xE2 | 0xAF | 0xCC | 0xBF |

| ENGLISH / JAPANESE | ... | 0x20 | ... | 0x5E70 | ... | 0x30E0C1 | ... |
|---|---|---|---|---|---|---|---|
| : | ... | ... | ... | ... | ... | ... | ... |
| 0xF350 | ... | 2642613 | ... | 91823 | ... | 19283 | ... |
| : | ... | ... | ... | ... | ... | ... | ... |
| 0xFFAC23 | ... | 231134 | ... | 2393 | ... | 135 | ... |
| : | ... | ... | ... | ... | ... | ... | ... |

FIG. 15

| ENGLISH | JAPANESE | TRANSLATION PROBABILITY |
|---|---|---|
| this | nichijou | 0.11 |
| ⋮ | ⋮ | ⋮ |
| this | honsho | 0.467 |
| manual | honsho | 0.4 |
| guide | honsho | 0.067 |
| ⋮ | ⋮ | ⋮ |

F I G. 1 6 A

| ENGLISH | JAPANESE | TRANSLATION PROBABILITY |
|---|---|---|
| 0x20 | 0xFFAC23 | 0.11 |
| ⋮ | ⋮ | ⋮ |
| 0x20 | 0xF350 | 0.467 |
| 0x5E70 | 0xF350 | 0.4 |
| 0x30E0C1 | 0xF350 | 0.067 |
| ⋮ | ⋮ | ⋮ |

F I G. 1 6 B

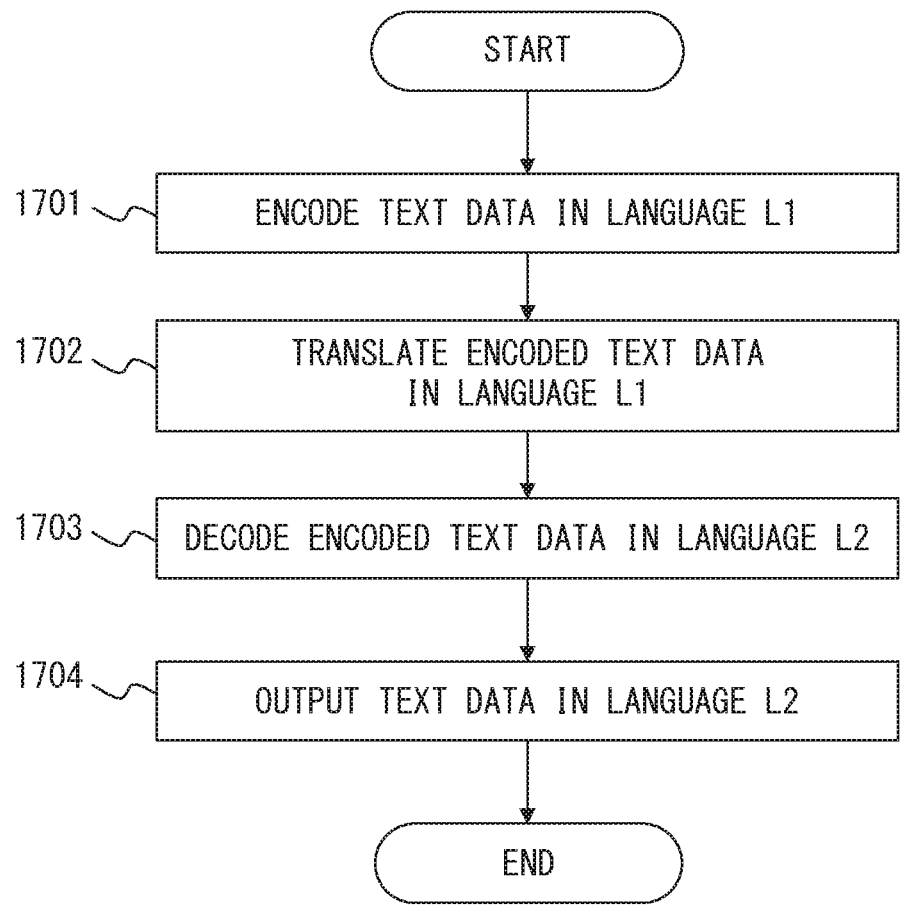
F I G. 17

| CODE | ENCODED SENTENCE 1 | ... | ENCODED SENTENCE n |
|---|---|---|---|
| ... | ... | ... | ... |
| 0x08 | 1 | ... | ... |
| 0x09 | 0 | ... | ... |
| 0x10 | 0 | ... | ... |
| ... | ... | ... | ... |
| 0x20 | 1 | ... | ... |
| ... | ... | ... | ... |
| 0x1B | 1 | ... | ... |
| ... | ... | ... | ... |
| 0xF8 | 1 | ... | ... |
| ... | ... | ... | ... |
| 0x5E70 | 1 | ... | ... |
| ... | ... | ... | ... |
| 0xE0A0 | 0 | ... | ... |
| 0xE0A1 | 0 | ... | ... |
| 0xE0A2 | 0 | ... | ... |
| 0xE0A3 | 1 | ... | ... |
| 0xE0A4 | 0 | ... | ... |
| ... | ... | ... | ... |

FIG. 20

| CODE | ENCODED SENTENCE 1 | ... | ENCODED SENTENCE n |
|---|---|---|---|
| ... | ... | ... | ... |
| 0xAE | 0 | ... | ... |
| 0xAF | 1 | ... | ... |
| 0xB0 | 0 | ... | ... |
| ... | ... | ... | ... |
| 0xBF | 1 | ... | ... |
| ... | ... | ... | ... |
| 0xCB | 0 | ... | ... |
| 0xCC | 1 | ... | ... |
| ... | ... | ... | ... |
| 0xE2 | 1 | ... | ... |
| ... | ... | ... | ... |
| 0xF3 | 1 | ... | ... |
| 0xF4 | 0 | ... | ... |
| ... | ... | ... | ... |
| 0xF350 | 1 | ... | ... |
| 0xF351 | 0 | ... | ... |
| 0xF352 | 0 | ... | ... |
| ... | ... | ... | ... |

| ENGLISH / JAPANESE | ... | 0x08 | 0x09 | 0x10 | ... | 0x20 | ... | 0x1B | ... |
|---|---|---|---|---|---|---|---|---|---|
| ... | ... | ... | ... | ... | ... | ... | ... | ... | ... |
| 0xAE | ... | 0 | ... | ... | ... | 0 | ... | 0 | ... |
| 0xAF | ... | 1 | ... | ... | ... | 1 | ... | 1 | ... |
| 0xB0 | ... | 0 | ... | ... | ... | 0 | ... | 0 | ... |
| ... | ... | ... | ... | ... | ... | ... | ... | ... | ... |
| 0xBF | ... | 1 | ... | ... | ... | 1 | ... | 1 | ... |
| ... | ... | ... | ... | ... | ... | ... | ... | ... | ... |
| 0xCB | ... | 0 | ... | ... | ... | 0 | ... | 0 | ... |
| 0xCC | ... | 1 | ... | ... | ... | 1 | ... | 1 | ... |
| ... | ... | ... | ... | ... | ... | ... | ... | ... | ... |
| 0xE2 | ... | 1 | ... | ... | ... | 1 | ... | 1 | ... |
| ... | ... | ... | ... | ... | ... | ... | ... | ... | ... |
| 0xF3 | ... | 1 | ... | ... | ... | 1 | ... | 1 | ... |
| 0xF4 | ... | 0 | ... | ... | ... | 0 | ... | 0 | ... |
| ... | ... | ... | ... | ... | ... | ... | ... | ... | ... |
| 0xF350 | ... | 1 | ... | ... | ... | 1 | ... | 1 | ... |
| 0xF351 | ... | 0 | ... | ... | ... | 0 | ... | 0 | ... |
| 0xF352 | ... | 0 | ... | ... | ... | 0 | ... | 0 | ... |
| ... | ... | ... | ... | ... | ... | ... | ... | ... | ... |

ALIGNMENT GENERATION DEVICE AND ALIGNMENT GENERATION METHOD

CROSS-REFERENCE TO RELATED APPLICATION

This application is based upon and claims the benefit of priority of the prior Japanese Patent Application No. 2018-044972, filed on Mar. 13, 2018, the entire contents of which are incorporated herein by reference.

FIELD

The embodiments discussed herein relate to an alignment generation device and an alignment generation method.

BACKGROUND

Statistical machine translation and neural machine translation have been known as technologies for translating text data written in a language into text data written in another language.

In statistical machine translation, a translation model and a language model are generated from multiple pairs of a source sentence and a target sentence (bilingual corpus), and source text data written in one language is translated into text data written in another language with the use of the translation model and the language model. In neural machine translation, a model that utilizes a neural network is used.

Patent Document 1: Japanese Laid-open Patent Publication No. 2015-22431
Patent Document 2: Japanese Laid-open Patent Publication No. 2016-71439
Patent Document 3: Japanese Laid-open Patent Publication No. 2013-117888
Patent Document 4: Japanese Laid-open Patent Publication No. 2013-196106
Non-patent Document 1: P. F. Brown et al., "The Mathematics of Statistical Machine Translation: Parameter Estimation", Computational Linguistics 19(2), pp. 263-311, 1993.
Non-patent Document 2: N. Kalchbrenner et al., "Recurrent Continuous Translation Models", In EMNLP, pp.1700-1709, 2013.

SUMMARY

According to an aspect of the embodiments, a non-transitory computer-readable recording medium stores an alignment generation program. The alignment generation program causes a computer to execute the following process.

(1) The computer generates a plurality of encoded sentences in the first language by encoding a plurality of sentences in the first language in prescribed units.

(2) The computer generates a plurality of encoded sentences in the second language by encoding a plurality of sentences in the second language, each of which is associated with each of the plurality of sentences in the first language, in the prescribed units.

(3) The computer generates alignment information indicating an alignment between a plurality of codes in the first language and a plurality of codes in the second language, based on a code included in each of the plurality of encoded sentences in the first language and a code included in an encoded sentence in the second language, which is associated with each of the plurality of encoded sentences in the first language.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates compression processing;
FIG. 10A illustrates a preprocessed English sentence;
FIG. 10B illustrates a preprocessed Japanese sentence;
FIG. 15 illustrates matrix information;
FIG. 16A illustrates a translation model;
FIG. 16B illustrates alignment information;
FIG. 17 is a flowchart illustrating translation processing;
FIG. 20 illustrates index information of an English encoded file;
FIG. 21 illustrates index information of a Japanese encoded file;
FIG. 22 illustrates matrix information generated from index information.

DESCRIPTION OF EMBODIMENTS

In the following descriptions, details of the embodiments are explained with reference to the drawings.

In statistical machine translation and neural machine translation, a translation model is generated through learning the alignment between terms in two languages from a bilingual corpus. A term corresponds to a word or a phrase, and a phrase includes a sequence of words. When a translation model is generated, preprocessing including morphological analysis is performed on a pair (combination) of a source sentence and a target sentence that are included in a bilingual corpus. However, because the morphological analysis involves a large amount of calculation, in the case of a bilingual corpus that includes a large number of pairs, it takes longer time to generate the translation model.

For example, in statistical machine translation, a translation model and a language model are generated from a bilingual corpus. A translation model is a probability model indicating the correctness of translation replacing a term W1 in a language L1 with a term W2 in a language L2, and a language model is a probability model indicating the correctness of the term W2 in the language L2. The correctness of the term W2 in the language L2 means the grammatical correctness, fluency of the term, and so forth.

With respect to a term included in the source text data in the language L1, by selecting a term in the language L2 so that the product of the probability indicated by a translation model and the probability indicated by a language model becomes the highest, text data in the language L2 that is the translation result is generated.

Figure 1:
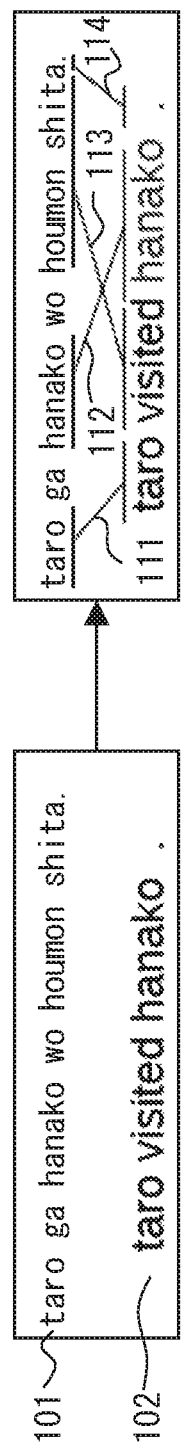
FIG. 1 illustrates a pair of a source sentence and a target sentence.

FIG. 1 illustrates an example of a pair of a source sentence and a target sentence included in a bilingual corpus. A sentence 101 in Japanese describes "taro ga hanako wo houmon shita." A sentence 102 in English describes "taro visited hanako". When either one of the sentence 101 and the sentence 102 is the source sentence, another one is the translated result, or the target sentence.

There are alignments indicated by a line 111 to a line 114 between each of words included in the sentence 101 (including punctuation marks) and each of words included in the sentence 102. In order to learn such an alignment, probability models have been widely used.

Figure 2:
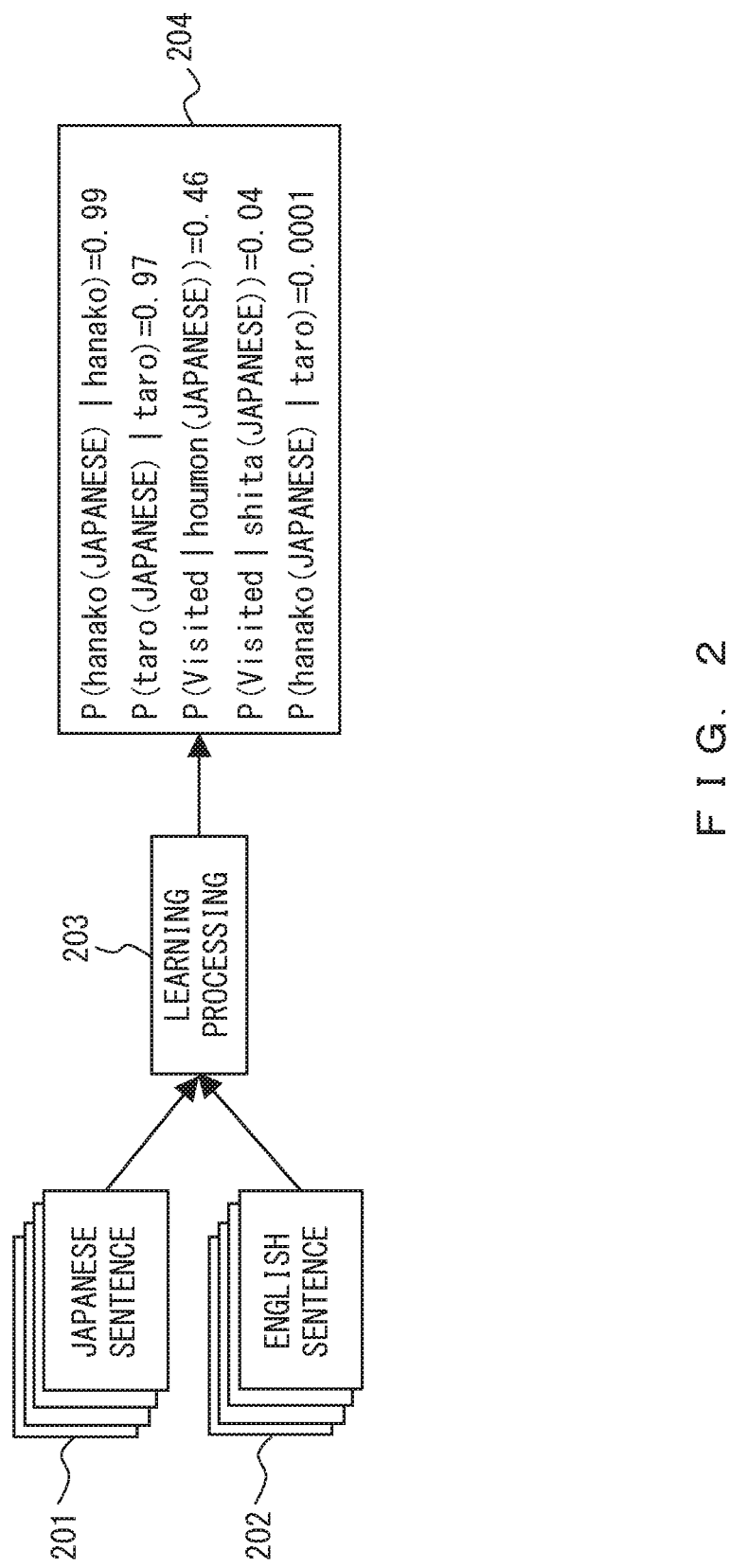
FIG. 2 illustrates processing for generating a translation model.

FIG. 2 illustrates an example of processing for generating a translation model from a bilingual corpus. The bilingual corpus includes multiple sentences 201 in Japanese including the sentence 101 in FIG. 1 and multiple sentences 202 in English including the sentence 102, and each of pairs of the Japanese sentences 201 and the English sentences 202 corresponds to a pair of a source sentence and a target sentence. In statistical machine translation, a translation model 204 is generated by performing leaning processing 203 using the multiple Japanese sentences 201 and the multiple English sentences 202.

The translation model 204 indicates a co-occurrence probability that a combination (a word WJ and a word WE) emerges in a pair of a source sentence and a target sentence for each combination of the word WJ included in the multiple Japanese sentences 201 and the word WE included in the multiple English sentences 202.

P(WJ|WE) denotes a co-occurrence probability that the word WJ appears in the source sentence and the word WE appears in the target sentence. P(WE|WJ) denotes a co-occurrence probability that the word WE appears in the source sentence and the word WJ appears in the target sentence. In this manner, P(WJ|WE) denotes the correctness of translation that replaces the Japanese word WJ with the English word WE, and P(WE|WJ) denotes the correctness of translation that replaces the English word WE with the Japanese word WJ.

For example, P(hanako(Japanese)|hanako)=0.99 denotes that the co-occurrence probability that "hanako(Japanese)" appears in the source Japanese sentence and "hanako" appears in the target English sentence is 0.99. This P(hanako (Japanese)|hanako) denotes the correctness of translation replacing "hanako(Japanese)" included in the source sentence with "hanako". Similarly to P(hanako(Japanese) |hanaka), P(taro(Japanese)|taro) and P(hanako(Japanese) |taro) denote the correctness of translation.

In addition, P(visited|houmon)=0.46 denotes a co-occurrence probability that "visited" appears in the source English sentence and "houmon" appears in the target Japanese sentence is 0.46. This P(visited|houmon) denotes the correctness of translation replacing "visited" included in the source sentence with "houmon". Similarly to P(visited|houmon), P(visited|shita) denotes the correctness of translation.

Figure 3:
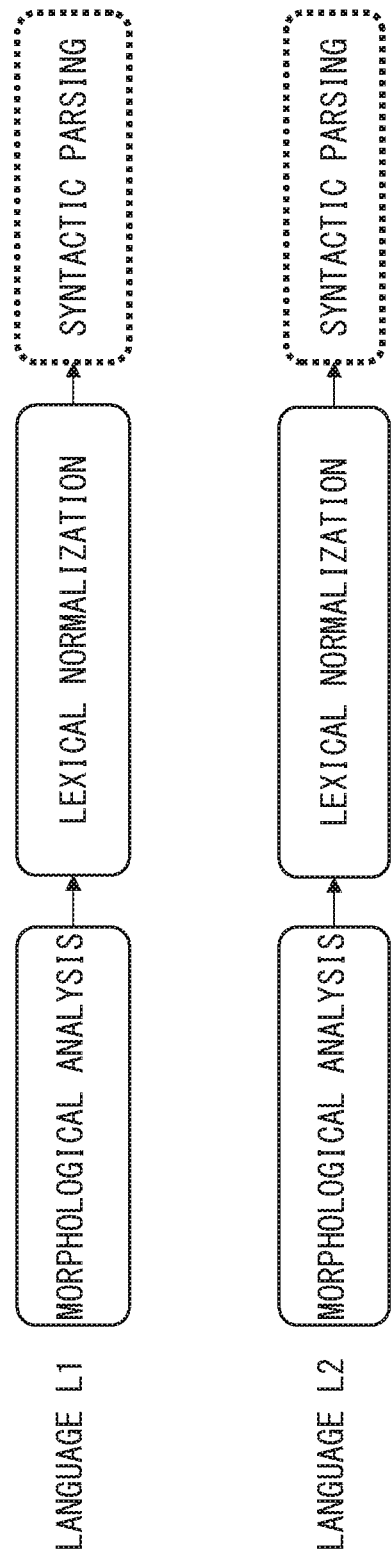
FIG. 3 illustrates preprocessing.

FIG. 3 illustrates an example of preprocessing in statistical machine translation and neural machine translation. In the case of machine translation between a language L1 and a language L2, preprocessing that includes morphological analysis, lexical normalization, and syntactic parsing is performed on sentences in each of the languages included in a bilingual corpus. In some cases, however, the syntactic parsing may be omitted.

The morphological analysis is processing for dividing text into morphemes and adding information such as parts of speech and attributes to each morpheme, and the lexical normalization is processing to have a unified representation for words or phrases of the same meaning. For example, by the lexical normalization, the first letter of a sentence that is usually capitalized is changed into a lowercase letter in the languages in Europe and the United States, and in Japanese, either one of a one-byte character or a two-byte character is selected to have a unified representation for katakana or numbers. The syntactic parsing is processing to synthesize a clause including a self-sufficient word based on information on parts of speech of a word, and obtaining a dependency relation (modification relation) between clauses based on the self-sufficient words included in the clauses.

As a result of such preprocessing, terms that are processing units in generating a translation model and a language model become clear. The text data generated as a result of the preprocessing is used as input data for model generation processing. The same preprocessing is conducted on the source text data, and the text data generated as a result of the preprocessing is used as input data for translation processing.

However, when a bilingual corpus that includes a number of pairs is used to enhance the translation accuracy, the amount of calculation in the learning processing to generate a translation model and a language model increases and large storage areas are occupied to store the calculation result. For that reason, it is difficult to increase the speed of the learning processing, and it may take several days or several dozen days for the learning processing.

At the beginning of the learning processing, because the result of the morphological analysis provided in FIG. 3 is discarded, the leaning processing based solely on a representation of each of the terms is conducted without utilizing the result. For example, the result of the morphological analysis includes information providing phrases such as idioms, inflected forms of verbs, and words in the same representation but have different meanings or different parts of speech. However, such information is not utilized in the learning processing.

More specifically, multiple words included in an idiom such as "in front of" are regarded as words unrelated to each other, and the same verb in different inflected forms such as "go" and "goes" is regarded as different words. Words written in the same Chinese characters but have different meanings or different parts of speech, such as an adverb "saichuu" and a noun "monaka", are regarded as the same word. Although the result of the morphological analysis includes a large amount of useful information as described above, the result is not utilized in the learning processing. Consequently, the learning efficiency decreases and the amount of calculation further increases.

In addition, when words have the same meaning but are written in different forms, such as "go" and "goes", the words are regarded as different information, and for that reason, it is difficult to divide data in a bilingual corpus for learning and to merge results of the leaning. As a result, parallel computation to increase the speed of the leaning processing is difficult.

Figure 4:
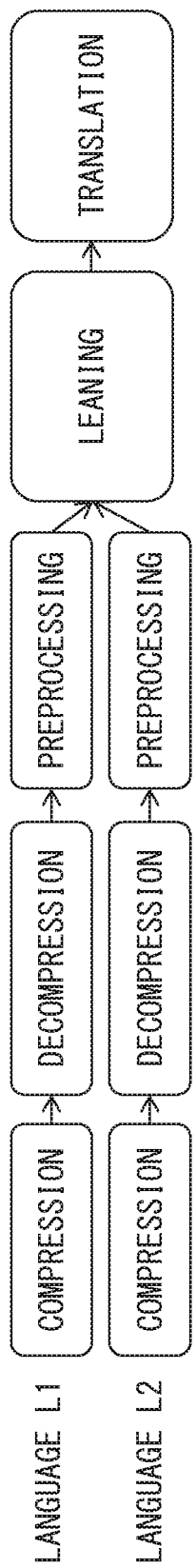
FIG. 4 illustrates the statistical machine translation.

FIG. 4 illustrates an example of statistical machine translation when a bilingual corpus is compressed for storage. When data is text data, the amount of the data in the corpus is large, and for that reason, multiple sentences in a language L1 and multiple sentences in a language L2 are compressed (encoded) and sentences in a compression format are stored in a storage device. When a translation model and a language model are generated, the sentences in a compression format are decompressed (deencoded) and the learning processing is conducted after the preprocessing is performed on the decompressed sentences. Subsequently, the source text data is translated with the use of the translation model and the language model. In this case, processing for decompressing a number of sentences is performed before the preprocessing, resulting in an addition of an amount of calculation for the decompression processing.

In view of this point, a possible method is a method that conducts learning processing on the compressed bilingual corpus, generates a translation model of compressed codes, and compresses the source text data for translation. This method makes the decompression processing and the preprocessing unnecessary and thus allows significant reduction of the amount of calculation. However, in compression algorithms that employ the longest match string, compression codes are not assigned in units of terms. Therefore, translation of text data in compression codes is impractical.

FIG. 5 illustrates an example of compression processing that employs the longest match string. For example, when text data 501 is compressed with the LZ77 algorithm, a dictionary includes multiple strings 502, and when the text data 501 is compressed with the LZ78 algorithm, the dictionary includes the multiple strings 503.

In the use of either compression algorithm, strings included in the dictionary and to which compression codes are assigned are not terms, but are strings in which a word is cut in the middle. For that reason, each of the compression codes does not correspond to a word or phrase, and a correct translation result would not be generated when the text data in compression codes is translated.

Figure 6:
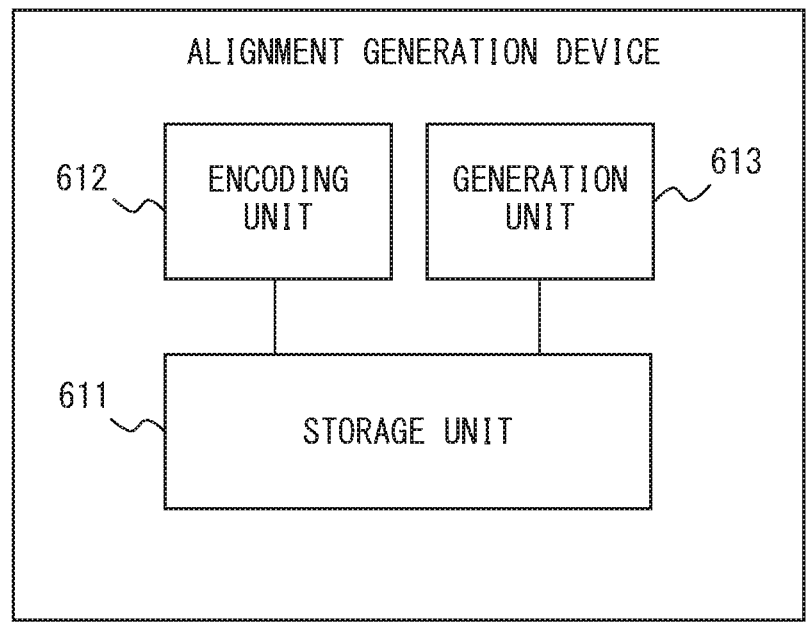
FIG. 6 illustrates a functional structure of the alignment generation device.

FIG. 6 illustrates an example of a functional structure of the alignment generation device according to the embodiments. An alignment generation device 601 in FIG. 6 includes a storage unit 611, an encoding unit 612, and a generation unit 613. The storage unit 611 stores multiple sentences in the first language and multiple sentences in the second language associated with each of the multiple sentences in the first language. The encoding unit 612 and the generation unit 613 perform alignment generation processing by using the sentences stored in the storage unit 611.

Figure 7:
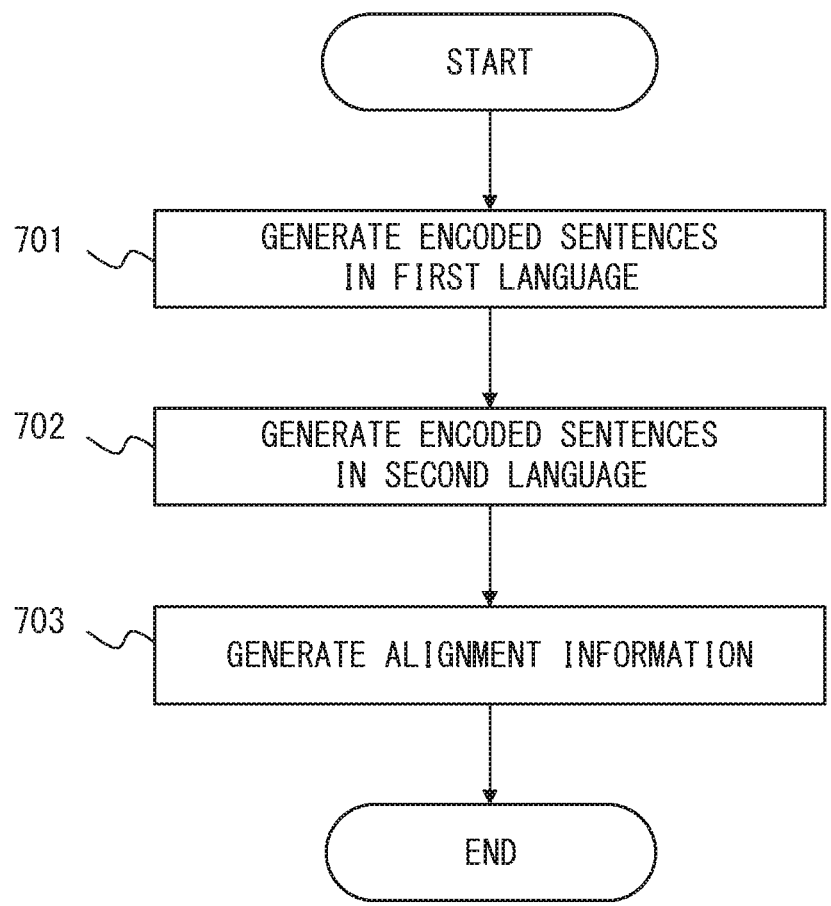
FIG. 7 is a flowchart illustrating alignment generation processing.

FIG. 7 is a flowchart illustrating an example of the alignment generation processing performed by the alignment generation device 601 in FIG. 6. The encoding unit 612 generates multiple encoded sentences in the first language by encoding the multiple sentences in the first language in the prescribed units (step 701). Next, the encoding unit 612 generates multiple encoded sentences in the second language by encoding the multiple sentences in the second language in the prescribed units (step 702).

The generation unit 613 generates alignment information based on codes included in each of the multiple encoded sentences in the first language and codes included in each of the multiple encoded sentences in the second language (step 703). The alignment information provides an alignment between multiple codes in the first language and multiple codes in the second language.

The alignment generation device 601 in FIG. 6 can generate, at high speed, the alignment of terms between two languages.

Figure 8:
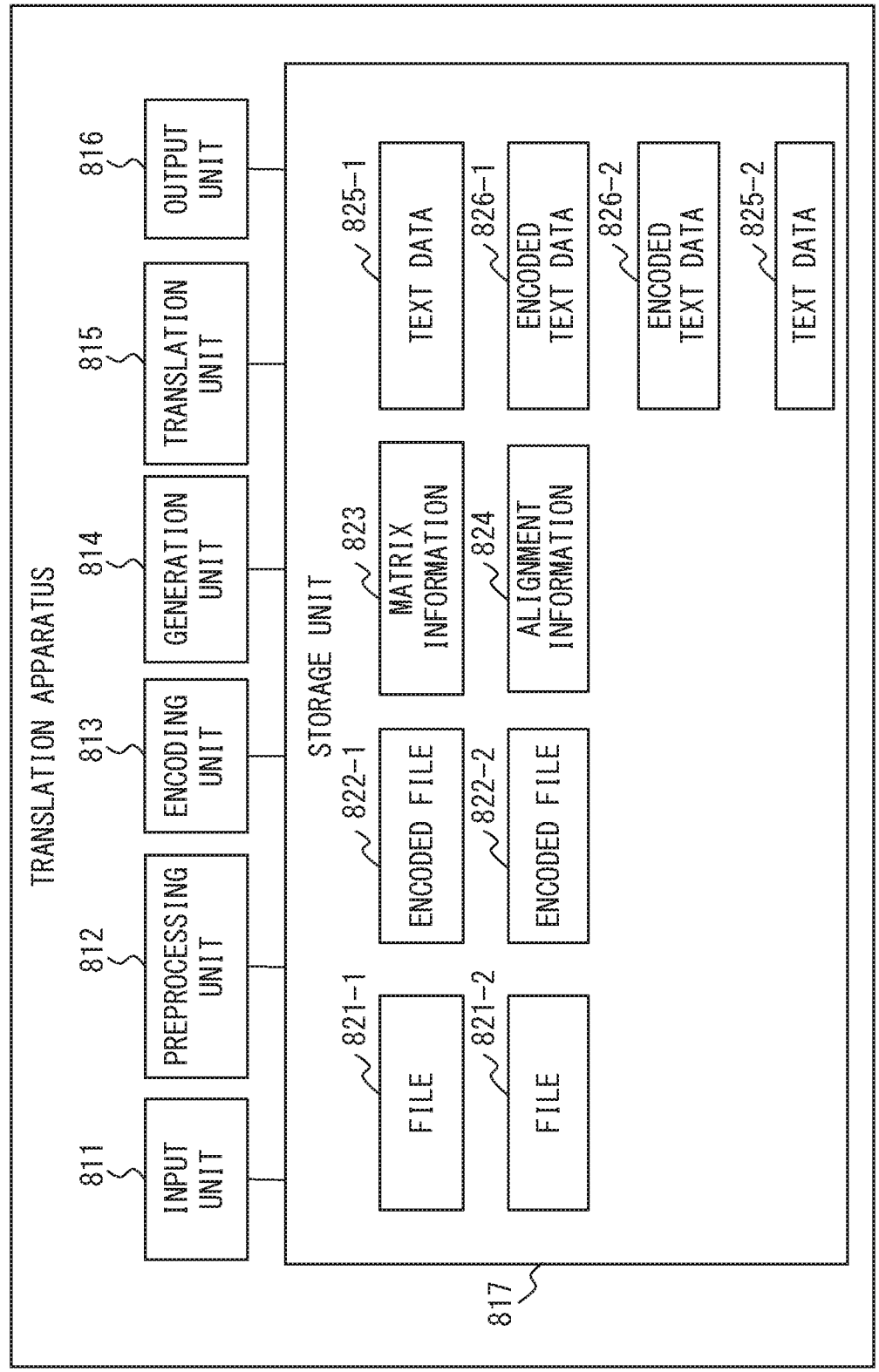
FIG. 8 illustrates a functional structure of a translation apparatus.

FIG. 8 illustrates an example of a functional structure of a translation apparatus having a function of the alignment generation device 601 in FIG. 6. A translation apparatus 801 in FIG. 8 includes an input unit 811, a preprocessing unit 812, an encoding unit 813, a generation unit 814, a translation unit 815, an output unit 816, and a storage unit 817. The encoding unit 813, the generation unit 814, and the storage unit 817 correspond to the encoding unit 612, the generation unit 613, and the storage unit 611 in FIG. 6, respectively.

When the translation apparatus 801 performs the alignment generation processing, the input unit 811 obtains a file 821-1 including multiple sentences in the language L1 and a file 821-2 including multiple sentences in the language L2 to store in the storage unit 817. The file 821-1 and the file 821-2 correspond to a bilingual corpus, and each of the multiple sentences included in the file 821-2 is associated with each of the multiple sentences included in the file 821-1. The language L1 and the language L2 may be any language including Japanese, English, Chinese, Korean, French, German, and Spanish, as an example.

The input unit 811 may obtain the file 821-1 and the file 821-2 input by an operator, or may obtain the file 821-1 and the file 821-2 from an external device over a communication network.

The preprocessing unit 812 performs preprocessing such as the morphological analysis and lexical normalization on each sentence included in the file 821-1 and the file 821-2, and the encoding unit 813 generates encoded sentences by encoding the preprocessed sentences in the prescribed units. The prescribed units are preferably a portion that has a single meaning valid in translation and, for example, a string in which a representation of terms is normalized (normalized string) can be used. In this case, different strings with the same meaning are changed into a normalized string, and one code (a normalized code) is assigned to one normalized string.

For example, one code is assigned to an idiom such as "in front of", and the same verb in different inflected forms such as "go" and "goes" is normalized and has the same code assigned. Similarly, in Japanese, endings of verb conjugation are normalized and verbs are encoded regardless of their endings. In addition, different codes are assigned to the words written in the same Chinese characters but have different meanings or different parts of speech, such as an adverb "saichuu" and a noun "monaka".

At that time, by assigning a shorter code to a normalized string that appears frequently and assigning a longer code to a normalized string that appears infrequently, the file 821-1 and the file 821-2 can be efficiently compressed. The terms included in multilingual text data can be expressed by one-byte codes (frequent) to three-byte codes (infrequent) depending on the frequency of appearance.

The encoding unit 813 generates multiple encoded sentences in the language L1 from the multiple sentences in the language L1 included in the file 821-1 and stores an encoded file 822-1 including the encoded sentences in the storage unit 817. The encoding unit 813 also generates multiple encoded sentences in the language L2 from the multiple sentences in the language L2 included in the file 821-2 and stores an encoded file 822-2 including the encoded sentences in the storage unit 817.

The generation unit 814 generates matrix information 823 from the encoded file 822-1 and the encoded file 822-2. Each encoded sentence S2 in the language L2 included in the encoded file 822-2 is associated with each encoded sentence S1 in the language L1 included in the encoded file 822-1.

Each column of the matrix information 823 corresponds to each code C1 in the language L1 included in the encoded file 822-1 and each row corresponds to each code C2 in the language L2 included in the encoded file 822-2. Each cell in the matrix information 823 indicates the number of times (co-occurrence) that the code C1 appears in the encoded sentence S1 and the code C2 appears in the encoded sentence S2 associated with the encoded sentence S1 for each combination of the code C1 and the code C2.

Next, the generation unit 814 generates, by using the matrix information 823, alignment information 824 indicating an alignment between multiple codes in the language L1 and multiple codes in the language L2. The alignment information 824 corresponds to a translation model of the language L1 and the language L2. The use of the matrix information 823 that records the number of co-occurrence for each of the combinations of the code C1 and the code C2 facilitates calculation of a co-occurrence probability $P(C1|C2)$ that indicates the code C1 appears in the source sentence and the code 2 appears in the target sentence. In this manner, processing for generating the alignment information 824 becomes efficient.

When the translation apparatus 801 performs translation processing, the input unit 811 obtains text data 825-1 in the language L1 to store in the storage unit 817. The input unit 811 may obtain the text data 825-1 input by an operator, or may obtain the text data 825-1 from an external device over a communication network.

The preprocessing unit 812 performs preprocessing on the text data 825-1. The translation unit 815 generates encoded text data 826-1 in the language L1 by encoding preprocessed the text data 825-1 in the prescribed units to store in the storage unit 817.

Next, the translation unit 815 translates the encoded text data 826-1 into encoded text data 826-2 in the language L2 based on the alignment information 824 and stores the encoded text data 826-2 in the storage unit 817. The translation unit 815 then generates text data 825-2 in the language L2 by decoding the encoded text data 826-2 in the language L2 to store in the storage unit 817. The output unit 816 outputs the text data 825-2 as a translation result.

According to this translation apparatus 801, each code included in an encoded sentence is associated with a portion that has single meaning by assigning one code to one normalized string. As a result, it is possible to allow learning of the alignment between codes in the language L1 and codes in the language L2 without decompressing the encoded file 822-1 and the encoded file 822-2, both of which are compressed. Because the decompression processing and the preprocessing become unnecessary, the alignment information 824 can be generated at high speed.

In addition, by using the alignment information 824 indicating the alignment between codes in the language L1 and codes in the language L2, encoded text data can be translated.

Figure 9:
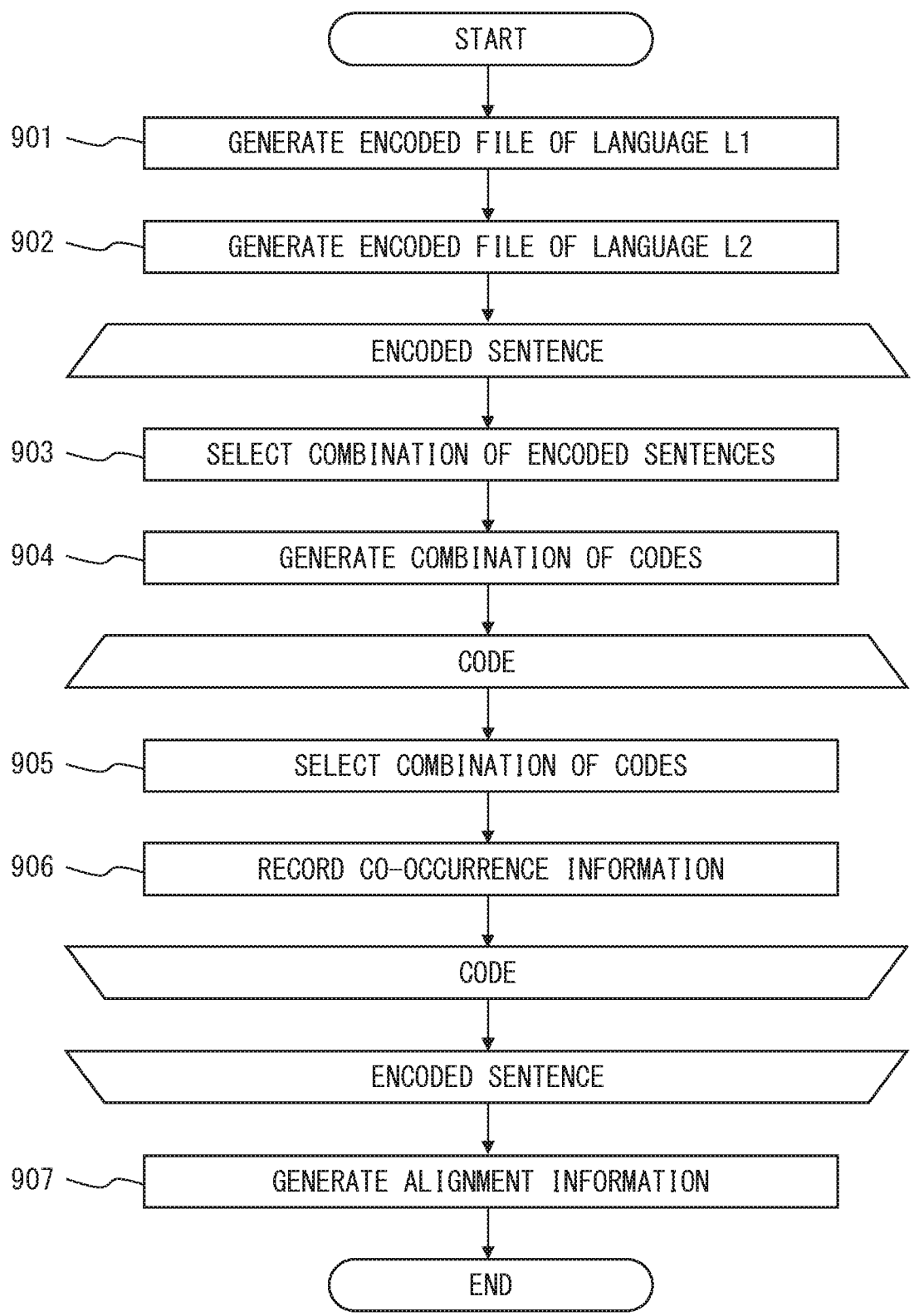
FIG. 9 is a flowchart illustrating a specific example of alignment generation processing.

FIG. 9 is a flowchart illustrating a specific example of alignment generation processing performed by the translation apparatus 801 in FIG. 8. The encoding unit 813 generates the encoded file 822-1 of the language L1 by performing encoding in units of normalized strings on sentences obtained by preprocessing each of sentences in the language L1 included in the file 821-1 (step 901).

Next, the encoding unit 813 generates the encoded file 822-2 of the language L2 by performing encoding in units of normalized sentences on sentences obtained by preprocessing each of sentence in the language L2 included in the file 821-2 (step 902).

FIG. 10A and FIG. 10B illustrates an example of a sentence on which preprocessing including the morphological analysis and the lexical normalization were performed. FIG. 10A provides a sentence 1001 and a sentence 1002 in English corresponding to the language L1, and FIG. 10B provides a sentence 1011 and a sentence 1012 in Japanese corresponding to the language L2. The sentence 1001 and the sentence 1011 correspond to a pair of a source sentence and a target sentence, and the sentence 1002 and the sentence 1012 correspond to a pair of a source sentence and a target sentence. Lexical normalization is applied to the sentence 1001 and the sentence 1002 to change uppercase letters to lowercase letters.

Each of the sentence 1001, the sentence 1002, the sentence 1011, and the sentence 1012 is divided into morphemes (words). A boundary of words is expressed by a delimiter such as a space.

Figure 11:
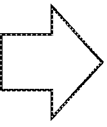
FIG. 11 illustrates an encoded sentence generated from the first English sentence.

FIG. 11 illustrates an example of an encoded sentence generated from the sentence 1001 in English provided in FIG. 10A. The sentence 1001 includes twelve words including a period, and each word is replaced with one-byte or two-byte code. For example, a word "we" is replaced with a one-byte code "0x28" and a word "hope" is replaced with a two-byte code "0xA3B0".

Before the encoding, the sentence 1001 includes thirty-nine alphabets and eleven spaces corresponding to delimiters between words. When a single alphabet corresponds to one byte and a space also corresponds to one byte, the amount of data for the sentence 1001 is 50 bytes (=39+11).

Meanwhile, the encoded sentence 1101 includes eight one-byte codes and four two-byte codes and the amount of data for the encoded sentence 1101 is sixteen bytes (=8+2×4). As a result of the encoding, the amount of data is reduced to 16/50 (32%).

Figure 12:
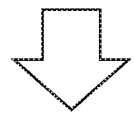
FIG. 12 illustrates an encoded sentence generated from the second English sentence.

FIG. 12 illustrates an example of an encoded sentence generated from the sentence 1002 in English provided in FIG. 10A. The sentence 1002 includes six words and each word is replaced with one-byte or two-byte code. For example, a word "contents" is replaced with a two-byte code "0xE0A3", and a word "and" is replaced with a one-byte code "0x1B".

Before the encoding, the sentence 1002 includes twenty-six alphabets and five spaces and the amount of data for the sentence 1002 is thirty-one bytes (=26+5). Meanwhile, the encoded sentence 1102 includes four one-byte codes and two two-byte codes and the amount of data for the encoded sentence 1102 is eight bytes (=4+2×2). As a result of the encoding, the amount of data is reduced to 8/31 (about 25.8%).

Figure 13:
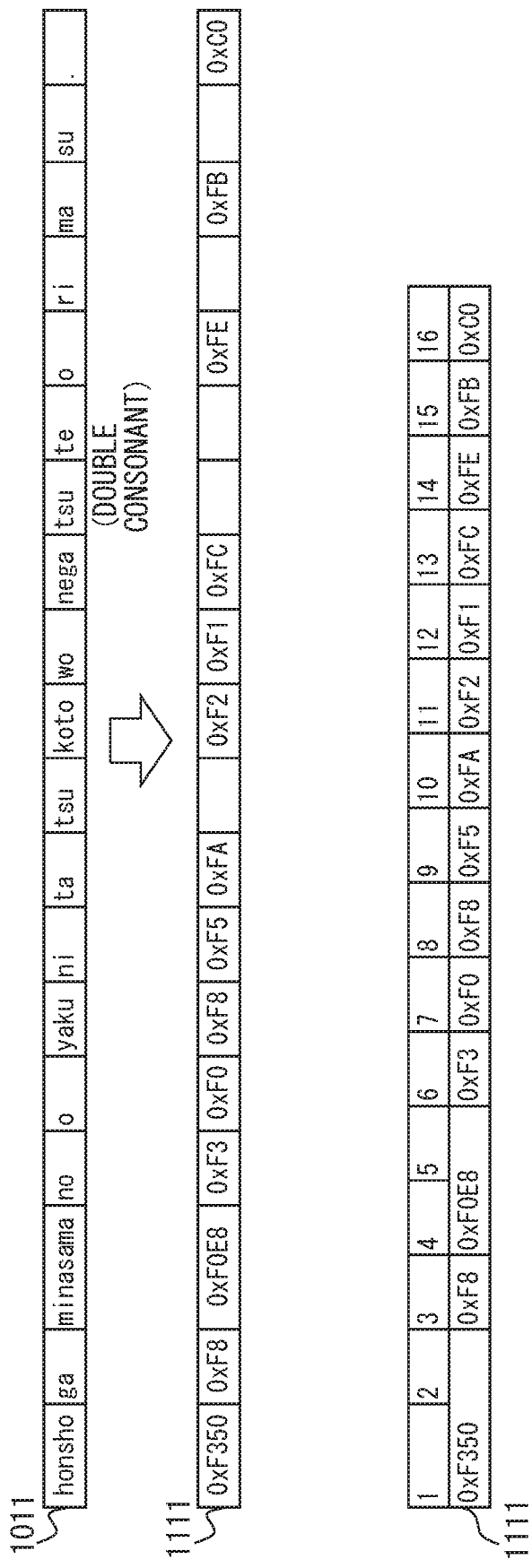
FIG. 13 illustrates an encoded sentence generated from the first Japanese sentence.

FIG. 13 illustrates an example of an encoded sentence generated from the sentence 1011 in Japanese provided in FIG. 10B. In the case of Japanese, words such as endings of verb conjugation and postpositional particles do not need to be included in the alignment information 824 and such words are excluded from encoding. As for the encoding format, Unicode Transformation Format-8 (UTF-8) is used.

The sentence 1011 includes nineteen words including a point. From among the words, "tsu", "tsu (double consonant)", "ri", and "su", which are endings of verb conjugation, and "te", which is a postpositional particle, are not encoded, and the remaining fourteen words are replaced with one-byte or two-byte codes. For example, a word "honsho" is replaced with a two-byte code "0xF350", and a word "ga" is replaced with a one-byte code "0xF8".

Before the encoding, the sentence 1011 includes twenty-four characters and eighteen spaces. When one character is represented by three bytes and a space is one byte, the amount of data for sentence 1011 is 90 bytes (=3×24+18).

Meanwhile, the encoded sentence 1111 includes twelve one-byte codes and two two-byte codes and the amount of data for the encoded sentence 1111 is sixteen bytes (=12+2×2). As a result of the encoding, the amount of data is reduced to 16/90 (about 17.8%).

Figure 14:
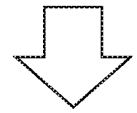
FIG. 14 illustrates an encoded sentence generated from the second Japanese sentence.

FIG. 14 illustrates an example of an encoded sentence generated from the sentence 1012 in Japanese provided in FIG. 10B. The sentence 1012 includes seven words. From among the words, "i", which is ending of verb conjugation, is not encoded, and the remaining six words are replaced with one-byte or two-byte codes. For example, a word "honsho" is replaced with a two-byte code "0xF350", and a word "no" is replaced with a one-byte code "0xF3".

Before the encoding, the sentence 1012 includes ten characters and six spaces and the amount of data for the sentence 1012 is thirty-six bytes (=3×10+6). Meanwhile, the sentence 1112 includes five one-byte codes and one two-byte code and the amount of data for the encoded sentence 1112 is seven bytes (=5+2×1). As a result of the encoding, the amount of data is reduced to 7/36 (about 19.4%).

Next, the generation unit 814 selects a combination of one encoded sentence S1 in the language L1 included in the encoded file 822-1 and one encoded sentence S2 in the language L2 included in the encoded file 822-2 (step 903). The encoded sentence S1 and the encoded sentence S2 are associated with each other as sentences with the same meaning.

Next, the generation unit 814 extracts all codes included in the encoded sentence S1 and extracts all codes included in the encoded sentence S2 to generate all combinations of codes in the language L1 and codes in the language L2 (step 904).

Next, the generation unit 814 selects a combination of a code C1 in the language L1 and a code C2 in the language L2 (step 905), and records in the matrix information 823 co-occurrence information that indicate the code C1 and the code C2 are co-occurring (step 906). At that time, the generation unit 814 performs any of the processing provided below.

(P1) When the code C1 is not registered in any of the columns of the matrix information 823 and the code C2 is not registered in any of the rows of the matrix information 823.

The generation unit 814 adds the code C1 to a column of the matrix information 823, adds the code C2 to a row of the matrix information 823, and records the number of co-occurrence "1" in the new cell corresponding to the code C1 and the code C2.

(P2) When the code C1 is not registered in any of the columns of the matrix information 823 but the code C2 is registered in a row of the matrix information 823.

The generation unit 814 adds the code C1 to a column of the matrix information 823 and records the number of co-occurrence "1" in the new cell corresponding to the code C1 and the code C2.

(P3) When the code C1 is registered in a column of the matrix information 823 but the code C2 is not registered in any of the rows of the matrix information 823.

The generation unit 814 adds the code C2 to a row of the matrix information 823 and records the number of co-occurrence "1" in the new cell corresponding to the code C1 and the code C2.

(P4) When the code C1 is registered in a column of the matrix information 823 and the code C2 is registered in a row of the matrix information 823.

The generation unit 814 causes the number of co-occurrence to be incremented by one in the existing cell corresponding to the code C1 and the code C2.

The generation unit 814 then repeats the processing in step 905 and the subsequent step for the next combination of a code in the language L1 and a code in the language L2. When all combinations of codes in the language L1 and codes in the language L2 are selected, the generation unit 814 repeats the processing in step 903 and the subsequent steps for the next combination of an encoded sentence in the language L1 and an encoded sentence in the language L2.

FIG. 15 illustrates an example of the matrix information 823 generated by the processing in step 903 to step 906. Each column of the matrix information 823 in FIG. 15 has a code in English and each row has a code in Japanese. The number in each cell of the matrix information 823 indicates the number of co-occurrence of a code C1 in English and a code C2 in Japanese, which correspond to the cell. For example, the number of co-occurrence "2642613" in a cell corresponding to a code "0x20" in English and a code "0xF350" in Japanese indicates 2642613 times of co-occurrence of these codes in the encoded file 822-1 and the encoded file 822-2.

When all combinations of encoded sentences in the language L1 and encoded sentences in the language L2 are selected, the generation unit 814 generates the alignment information 824 by using the matrix information 823 (step 907). At that time, the generation unit 814 can calculate a co-occurrence probability P(C1|C2) indicating that a code C1 appears in a source sentence and a code C2 appears in a target sentence from the number of co-occurrence indicated by a cell of the matrix information 823. The generation unit 814 then generates the alignment information 824 by using the co-occurrence probability P(C1|C2) as a translation probability of replacing the code C1 with the code C2.

FIG. 16A and FIG. 16B illustrates an example of a translation model and alignment information 824. FIG. 16A illustrates an example of a conventional translation model generated from the file 821-1 and the file 821-2. The translation probability indicates the correctness of translation that replaces an English word with a Japanese word. For example, the correctness of translation replacing "this" with "nichijou" is "0.11". The amount of data for words included in the translation model in FIG. 16A is provided below.

"this": 4 bytes
"manual": 6 bytes
"guide": 5 bytes
"nichijo": 6 bytes
"honsho": 6 bytes On the other hand, FIG. 16B illustrates an example of the alignment information 824 generated from the encoded file 822-1 and the encoded file 822-2. The translation probability indicates the correctness of translation that replaces a code in English with a code in Japanese. For example, the correctness of translation replacing a code "0x20" corresponding to "this" with a code "0xFFAC23" corresponding to "nichijo" is "0.11". The amount of data for codes included in the alignment information 824 in FIG. 16B is provided below.

Code "0x20" corresponding to "this": 1 byte
Code "0x5E70" corresponding to "manual": 2 bytes
Code "0x30E0C1" corresponding to "guide": 3 bytes
Code "0xFFAC23" corresponding to "nichijo": 3 bytes
Code "0xF350" corresponding to "honsho": 2 bytes By using the alignment information 824 as a translation model instead of the conventional translation model, the amount of data for a translation model can be significantly reduced. Reduction in the amount of data for a translation model allows faster speed search in the translation model, and the speed of the translation processing is increased.

In step 901 and step 902 in FIG. 9, the encoding unit 813 can assign one code to a string of multiple words such as idioms or set phrases. For example, the following codes may be assigned to the English strings as below.

"in front of" (11 bytes): "0xFE03F9" (3 bytes)
"get rid of" (10 bytes): "0xFFFC30" (3 bytes)
"kick the bucket" (15 bytes): "0xFFFCEA" (3 bytes)
"take . . . out" (9 bytes): "0xA021C0" (3 bytes)

The encoding unit 813 can also assign different codes to words in the same representation but have different meanings or different parts of speech. For example, with respect to Chinese characters that can be read as both "saichuu" and "monaka", the following two codes can be assigned.

Chinese characters representing "monaka" as in "monaka wo taberu" (6 bytes): "0xFF0A03" (3 bytes)
Chinese characters representing "saichuu" as in "ramen wo taberu saichuu ni" (6 bytes): "0xFF0A04" (3 bytes)

By assigning one code to a portion that has single meaning in a manner described above, the accuracy of the alignment information 824 increases and the translation accuracy can be improved. In addition, by assigning codes to a string in which the representation of words or phrases is normalized, the same code is assigned to words that have the same meaning but have different representations such as "go" and "goes". As a result, it becomes possible to divide data in a bilingual corpus, to perform parallel computation to learn at high speed, and to merge results of the learning.

FIG. 17 is a flowchart illustrating an example of translation processing performed by the translation apparatus 801 in FIG. 8. The translation unit 815 generates encoded text data 826-1 in the language L1 by encoding preprocessed text data 825-1 in the language L1 in units of normalized strings (step 1701).

Next, the translation unit 815 translates the encoded text data 826-1 into encoded text data 826-2 in the language L2 based on the alignment information 824 (step 1702). For example, the translation unit 815 can generate the encoded text data 826-2 by replacing each code in the language L1 included in the encoded text data 826-1 with a code in the language L2 that has the highest translation probability in the alignment information 824.

The translation unit 815 then generates text data 825-2 in the language L2 by decoding the encoded text data 826-2 (step 1703), and the output unit 816 outputs the text data 825-2 (step 1704).

The translation apparatus 801 can generate index information indicating what codes are included in encoded sentences in the language L1 and in the language L2 at the time of generating the encoded file 822-1 and the encoded file 822-2. By using this index information, the alignment information 824 can be efficiently generated.

Figure 18:
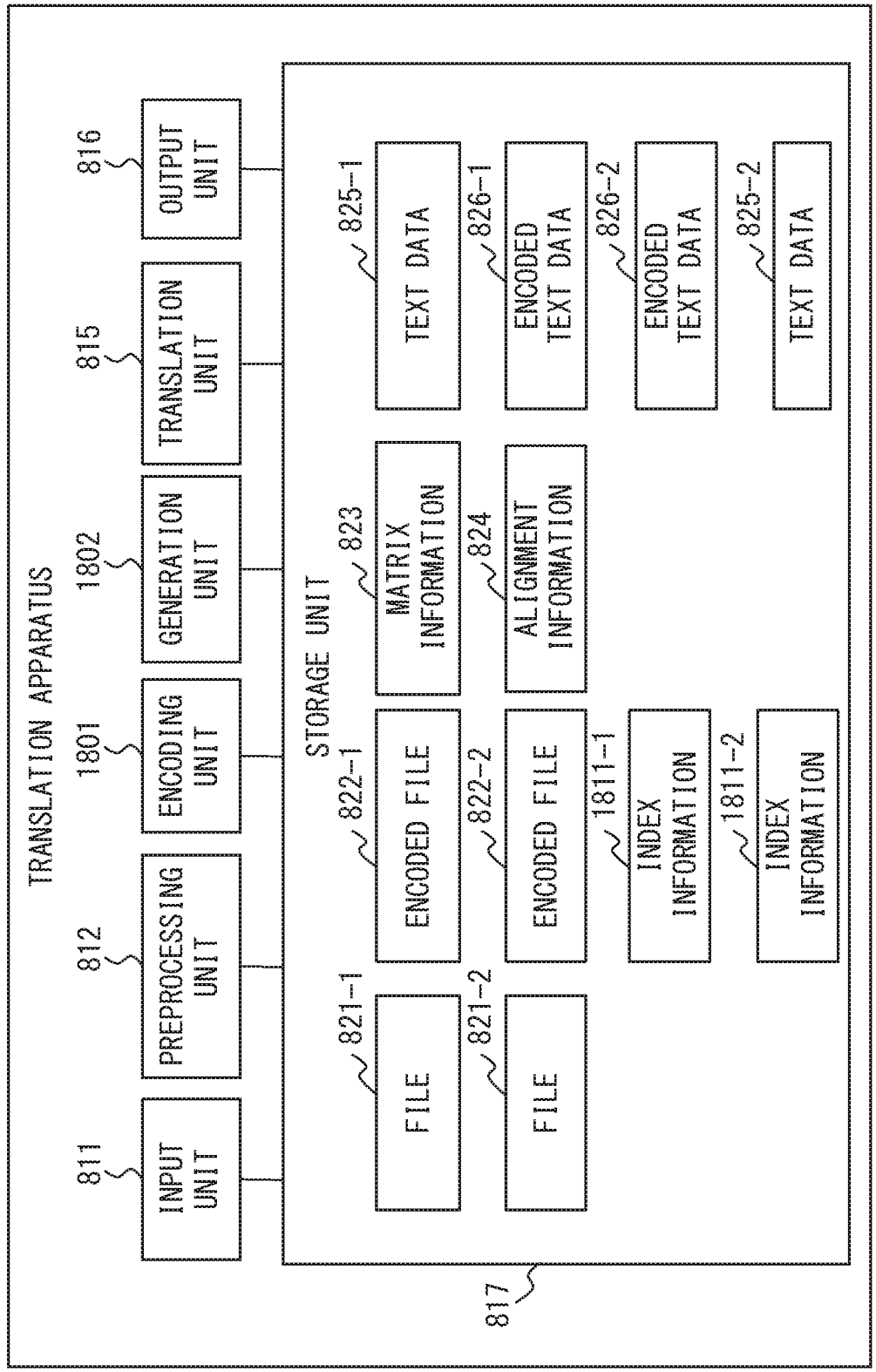
FIG. 18 illustrates a functional structure of a translation apparatus that uses index information.

FIG. 18 illustrates an example of a functional structure of the translation apparatus that uses index information. The translation apparatus 801 in FIG. 18 has a configuration similar to the translation apparatus 801 in FIG. 8 but the encoding unit 813 and the generation unit 814 are replaced with an encoding unit 1801 and a generation unit 1802, respectively.

The encoding unit 1801 generates an encoded file 822-1 and an encoded file 822-2 from a file 821-1 and a file 821-2, respectively, in the manner similar to the encoding unit 813, and generates index information 1811-1 and index information 1811-2.

The index information 1811-1 is information related to the encoded file 822-1 and has logical values, each of which indicates whether a code in the language L1 is included in an encoded sentence in the encoded file 822-1. The index information 1811-2 is information related to the encoded file 822-2 and has logical values, each of which indicates whether a code in the language L2 is included in an encoded sentence in the encoded file 822-2.

The generation unit 1802 generates the matrix information 823 based on the index information 1811-1 and the index information 1811-2 and generates the alignment information 824 by using the matrix information 823.

The index information 1811-1 and the index information 1811-2 indicate whether a code appears in respective encoded sentences for each of all codes included in the encoded file 822-1 and the encoded file 822-2. Accordingly, by using the index information 1811-1 and the index information 1811-2, the matrix information 823 that provides the number of co-occurrence of a code in the language L1 and a code in the language L2 can be generated at high speed.

Figure 19:
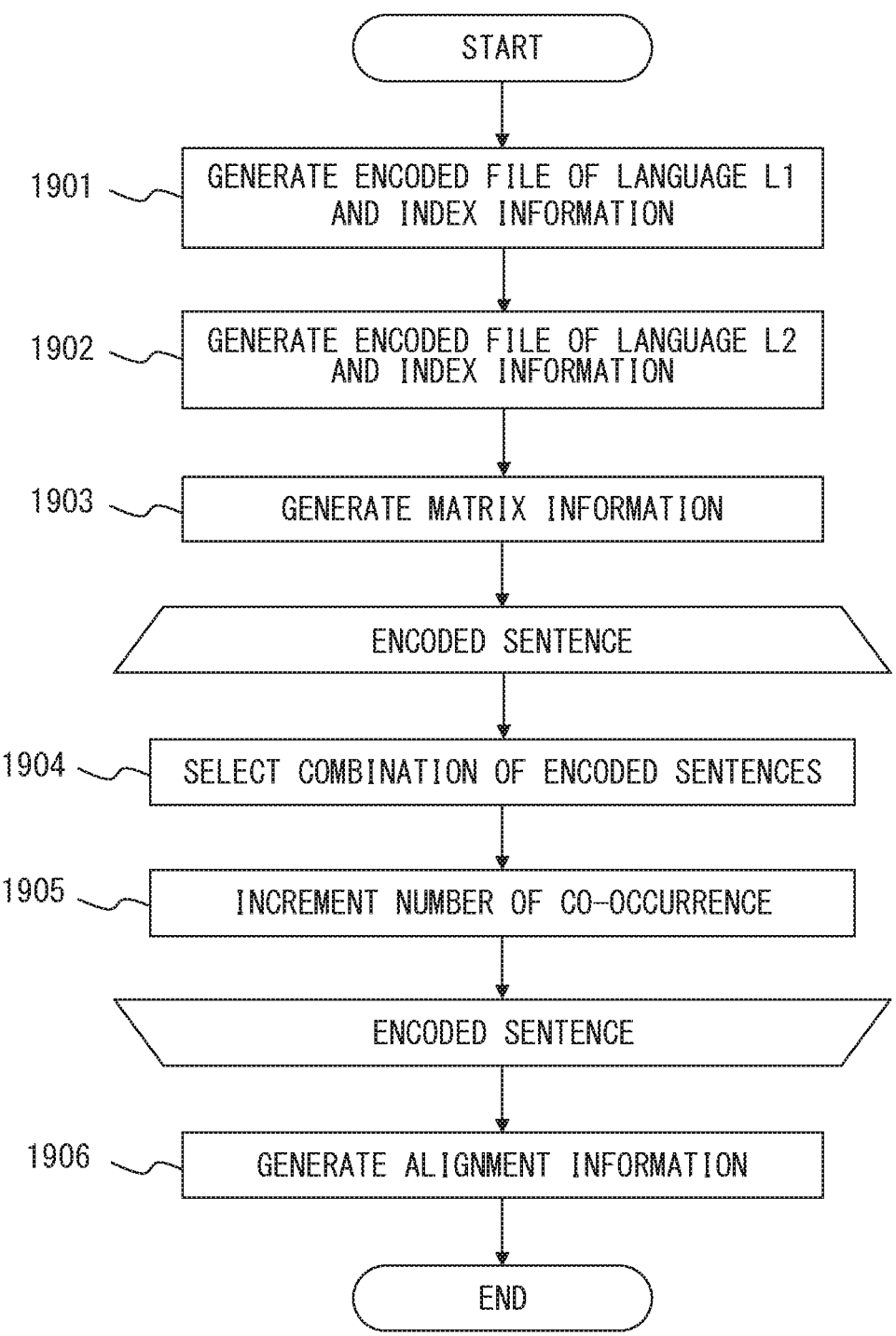
FIG. 19 is a flowchart illustrating a specific example of alignment generation processing that uses index information.

FIG. 19 is a flowchart illustrating a specific example of alignment generation processing that uses index information. The encoding unit 1801 generates the encoded file 822-1 of the language L1 and the index information 1811-1 by encoding preprocessed sentences in the language L1 included in the file 821-1 in units of normalized strings (step 1901). The encoded file 822-1 includes an encoded sentence 1 to an encoded sentence n (n is an integer greater than or equal to 2) of the language L1.

Next, the encoding unit 1801 generates the encoded file 822-2 of the language L2 and the index information 1811-2 by encoding preprocessed sentences in the language L2 included in the file 821-2 in units of normalized strings (step 1902). The encoded file 822-2 includes an encoded sentence 1 to an encoded sentence n in the language L2 and each of the encoded sentence 1 to the encoded sentence n in the language L2 is associated with each of the encoded sentence 1 to the encoded sentence n in the language L1.

FIG. 20 illustrates an example of index information of an English encoded file. Codes in FIG. 20 are multiple codes included in the English encoded file and these codes are sorted in ascending order of hexadecimal numbers indicating the codes. The encoded sentence 1 to the encoded sentence n represent n encoded sentences included in the English encoded file. From among the encoded sentences, the encoded sentence 1 corresponds to the encoded sentence 1102 in FIG. 12. The logical value "1" in a cell corresponding to a code and an encoded sentence indicates that the code is included in the encoded sentence, and the logical value "0" indicates that the code is not included in the encoded sentence.

For example, the logical value "1" in a cell corresponding to a code "0x08" and the encoded sentence 1 indicates that the code "0x08" is included in the encoded sentence 1. The logical value "0" in a cell corresponding to a code "0x09" and the encoded sentence 1 indicates that the code "0x09" is not included in the encoded sentence 1.

FIG. 21 illustrates an example of index information of a Japanese encoded file. Codes in FIG. 21 are multiple codes included in the Japanese encoded file and these codes are sorted in ascending order of hexadecimal numbers indicating the codes. The encoded sentence 1 to the encoded sentence n represents n encoded sentences included in the Japanese encoded file. From among the encoded sentences, the encoded sentence 1 corresponds to the encoded sentence 1112 in FIG. 14. The encoded sentence 1 to the encoded sentence n in FIG. 21 are associated with the encoded sentence 1 to the encoded sentence n in FIG. 20, respectively. As in FIG. 20, the logical value in a cell corresponding to a code and an encoded sentence indicates whether the code is included in the encoded sentence.

Next, the generation unit 1802 generates the matrix information 823 by using codes included in the index information 1811-1 and the index information 1811-2 (step 1903). At that time, the generation unit 1802 places each code of the language L1 included in the index information 1811-1 in each column of the matrix information 823 and places each code of the language L2 included in the index information 1811-2 in each row. The generation unit 1802 then records "0" as the number of co-occurrence in all cells corresponding to the rows and the columns to initialize matrix information 823.

Next, the generation unit 1802 selects a combination of an encoded sentence i (i=1 to n) in the language L1 recorded in the index information 1811-1 and an encoded sentence i in the language L2 recorded in the index information 1811-2 (step 1904). The generation unit 1802 then increments the number of co-occurrence in a specific cell of the matrix information 823 by using the logical value recorded in the column of the encoded sentence i in the language L1 and the logical value recorded in the column of the encoded sentence i in the language L2 (step 1905).

At that time, the generation unit 1802 searches in the index information 1811-1 for the logical value "1" from the column of the encoded sentence i in the language L1 and identifies a column of the matrix information 823 corresponding to the code indicated by the searched logical value "1". The generation unit 1802 also searches in the index information 1811-2 for the logical value "1" from the column of the encoded sentence i in the language L2 and identifies a row of the matrix information 823 corresponding to the code indicated by the searched logical value "1". The generation unit 1802 increments the number of co-occurrence by one in a cell corresponding to the identified row and column.

As described above, a code in the index information 1811-1 can be used as an address to identify a column of the matrix information 823 and a code in the index information 1811-2 can be used as an address to identify a row of the matrix information 823. In this manner, the generation unit 1802 can make access to each cell of the matrix information 823 at high speed and can increment the number of co-occurrence by using the index information 1811-1 and the index information 1811-2.

In addition, by using one-bit values as logical values in the index information 1811-1 and the index information 1811-2, the matrix information 823 can be updated by a bit operation.

The generation unit 1802 then repeats the processing in step 1904 and the subsequent steps for the next combination of an encoded sentence i in the language L1 and an encoded sentence i in the language L2.

FIG. 22 illustrates an example of the matrix information 823 generated from the index information 1811-1 and the index information 1811-2. This example assumes a case in which a combination of the encoded sentence 1 in FIG. 20 and the encoded sentence 1 in FIG. 21 is first selected in step 1904.

In this case, six logical values "1" are retrieved from the column of the encoded sentence 1 in FIG. 20 and six codes corresponding these six logical values "1" are identified as codes specifying columns of the matrix information 823 in FIG. 22. In addition, six logical values "1" are retrieved from the column of the encoded sentence 1 in FIG. 21 and six codes corresponding these six logical values "1" are identified as codes specifying rows of the matrix information 823 in FIG. 22. The number of co-occurrence in thirty-six cells corresponding to the specified rows and columns is incremented from "0" to "1". FIG. 22 provides the number of co-occurrence in eighteen cells from among the thirty-six cells.

By repeating this processing for each of all combinations of an encoded sentence i in FIG. 20 and an encoded sentence i in FIG. 21, the matrix information 823 illustrated in FIG. 15 can be generated.

When all combinations of an encoded sentence i in the language L1 and an encoded sentence i in the language L2 are selected, the generation unit 1802 generates the alignment information 824 by using the matrix information 823 (step 1906).

The configuration of the alignment generation device 601 in FIG. 6 is merely an example and a part of elements may be omitted or modified in accordance with the usage or conditions of the alignment generation device 601.

The configuration of the translation apparatus 801 in FIG. 8 and FIG. 18 is merely an example, and a part of elements may be omitted or modified in accordance with the usage or conditions of the translation apparatus 801. For example, when the preprocessing is conducted in an external device, the preprocessing unit 812 can be omitted. When the translation processing is conducted in an external device, the translation unit 815 and the output unit 816 can be omitted.

In the translation apparatus 801 in FIG. 8, when the alignment generation processing is conducted in an external device, the preprocessing unit 812, the encoding unit 813, and the generation unit 814 can be omitted. In the translation apparatus 801 in FIG. 18, when the alignment generation processing is conducted in an external device, the preprocessing unit 812, the encoding unit 1801, and the generation unit 1802 can be omitted.

The flowcharts in FIG. 7, FIG. 9, FIG. 17 and FIG. 19 are merely examples and a portion of processing maybe omitted or modified in accordance with the configurations or conditions of the alignment generation device 601 and the translation apparatus 801.

The sentences in FIG. 1, FIG. 10A and FIG. 10B, the translation models in FIG. 2 and FIG. 16A, the text data in FIG. 5, the encoded sentences in FIG. 11 to FIG. 14, the matrix information in FIG. 15 and FIG. 22, the alignment information in FIG. 16B, and the index information in FIG. 20 and FIG. 21 are merely examples. The translation models, the encoded sentences, the matrix information, the alignment information, and the index information vary in accordance with pairs of source sentences and target sentences included in a bilingual corpus. The language L1 and the language L2 can be any languages other than Japanese or English.

The preprocessing in FIG. 3 and statistical machine translation in FIG. 4 are merely examples and a part of processing can be omitted or modified in accordance with the configurations or conditions of the alignment generation device 601 or the translation apparatus 801.

Figure 23:
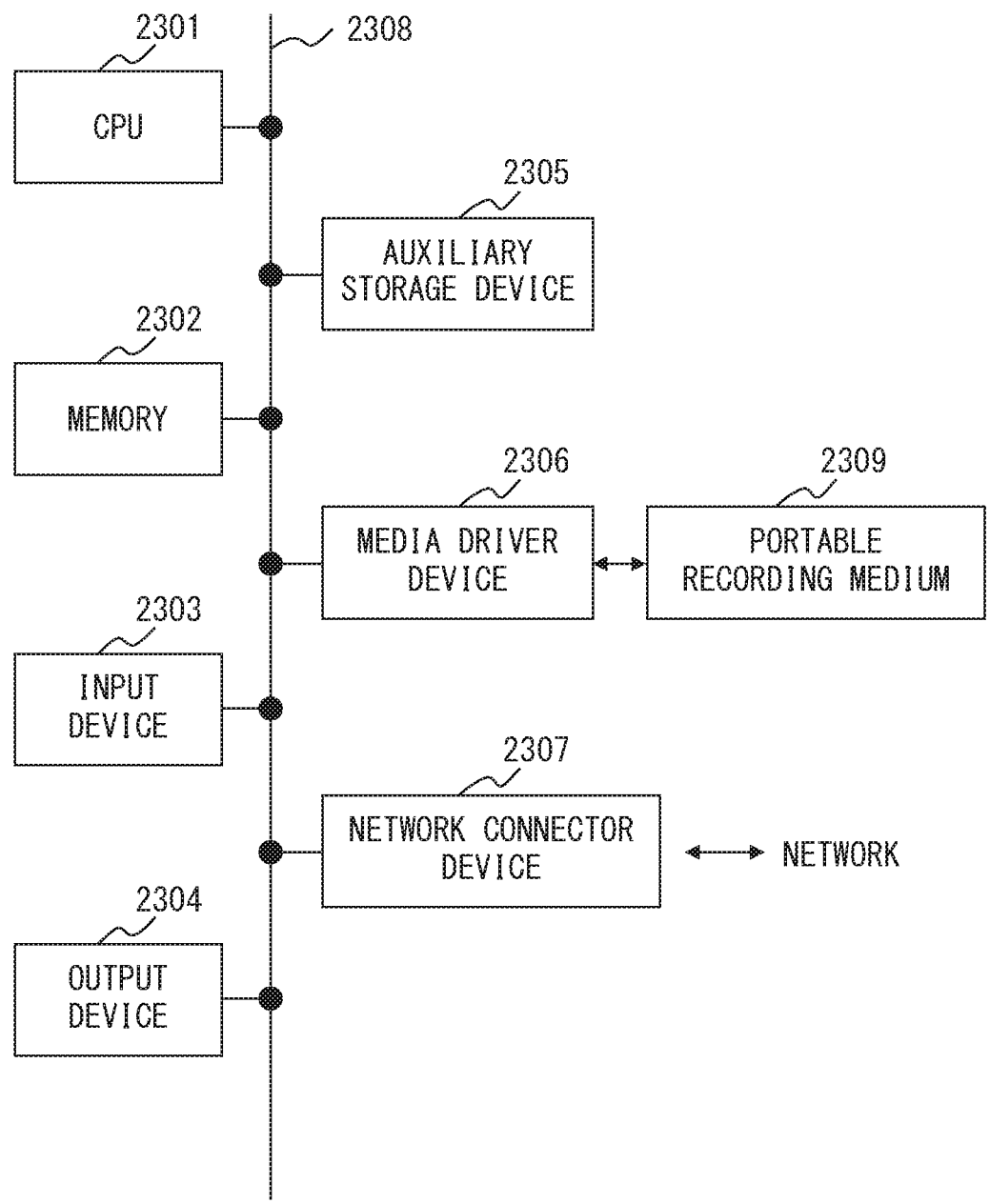
FIG. 23 illustrates a configuration of an information processing device.

FIG. 23 illustrates a configuration example of an information processing device (computer) used as the alignment generation device 601 in FIG. 6 or the translation apparatus 801 in FIG. 8 and FIG. 18. The information processing device in FIG. 23 is provided with a Central Processing Unit (CPU) 2301, a memory 2302, an input device 2303, an output device 2304, an auxiliary storage device 2305, a media driver device 2306, and a network connector device 2307. These devices are coupled with each other by a bus 2308.

The memory 2302 is a semiconductor memory such as a Read Only Memory (ROM), a Random Access Memory (RAM), and a flash memory and stores a program and data that are used for the processing. The memory 2302 can be used as the storage unit 611 in FIG. 6 or the storage unit 817 in FIG. 8 and FIG. 18.

By using the memory 2302 to execute a program, the CPU 2301 (processor) operates as the encoding unit 612 and the generation unit 613 in FIG. 6, the encoding unit 813 and the generation unit 814 in FIG. 8, and the encoding unit 1801 and the generation unit 1802 in FIG. 18. The CPU 2301 also operates as the preprocessing unit 812 and the translation unit 815 in FIG. 8 and FIG. 18 by using the memory 2302 to execute a program.

The input device 2303 is, for example, a keyboard, a pointing device, etc. and is used for inputting data and commands from an operator or a user. The input device 2303 can be used as the input unit 811 in FIG. 8 and FIG. 18.

The output device 2304 is, for example, a display device, a printer, a speaker, etc. and is used for outputting queries or commands to an operator or a user and a processing result. The output device 2304 can be used as the output unit 816 in FIG. 8 and FIG. 18. The processing result may be the text data 825-2.

The auxiliary storage device 2305 is, for example, a magnetic disk device, an optical disk device, a magneto-optical disk device, a tape device etc. The auxiliary storage device 2305 may be a hard disk drive or a flash memory. The information processing device can store a program and data in the auxiliary storage device 2305, and can load them into the memory 2302 for the use. The auxiliary storage device 2305 can be used as the storage unit 611 in FIG. 6 or the storage unit 817 in FIG. 8 and FIG. 18.

The media driver device 2306 drives a portable recording medium 2309 and accesses to the stored contents. The portable recording medium 2309 is a memory device, a flexible disk, an optical disk, a magneto-optical disk etc. The portable recording medium 2309 may be a Compact Disk Read Only Memory (CD-ROM), a Digital Versatile Disk (DVD), a Universal Serial Bus (USB) memory etc. An operator or a user can store a program and data in this portable recording medium 2309 and can load them into the memory 2302 for the use.

As described above, the computer-readable recording medium that stores a program and data used in the processing is a physical (non-transitory) recording medium such as the memory 2302, the auxiliary storage device 2305, or the portable recording medium 2309.

The network connector device 2307 is a communication interface circuit connected to a communication network such as a Local Area Network, a Wide Area Network etc., and converts data for communication. The information processing device can receive a program and data from an external device via the network connector device 2307 and can load them into the memory 2302 for the use. The network connector device 2307 can be used as the input unit 811 and the output unit 816 in FIG. 8 and FIG. 18.

It should be noted that the information processing device does not need to include all components in FIG. 23, but can omit a portion of the components in accordance with the usage or conditions. For example, when the information processing device does not interact with an operator or a user, the input device 2303 and the output device 2304 may be omitted. In addition, when the portable recording medium 2309 or a communication network is not used, the media driver device 2306 or the network connector device 2307 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an alignment generation program that causes a computer to execute a process comprising:

generating a first plurality of encoded sentences by encoding, in accordance with prescribed units, a plurality of sentences in a first language;

generating a second plurality of encoded sentences by encoding, in accordance with the prescribed units, a plurality of sentences in a second language, each of which is associated with each of the plurality of sentences in the first language; and generating relationship information indicating relationships between a first plurality of codes in the first plurality of encoded sentences and a second plurality of codes in the second plurality of encoded sentences, in accordance with a number of combinations of a first code included in a third plurality of codes and a second code included in a fourth plurality of codes, the combinations of the first code and the second code being included in a first plurality of combinations of each of the third plurality of codes and each of the fourth plurality of codes, the first plurality of combinations being generated for each of a second plurality of combinations generated by selecting each of the first plurality of encoded sentences and each of the second plurality of encoded sentences, the third plurality of codes being included in the selected first encoded sentence and the fourth plurality of codes being included in the selected second encoded sentence.

2. The non-transitory computer-readable recording medium according to claim 1, wherein the first code is associated with the second code.

3. The non-transitory computer-readable recording medium according to claim 1, wherein the encoding of the plurality of sentences in the first language includes generating first index information having a logical value indicating whether each of the first plurality of codes is included in each of the first plurality of encoded sentences, the encoding of the plurality of sentences in the second language includes generating second index information having a logical value indicating whether each of the second plurality of codes is included in each of the second plurality of encoded sentences, and the generating of the relationship information is executed in accordance with the first index information and the second index information.

4. The non-transitory computer-readable recording medium according to claim 1,
wherein the prescribed units correspond to a string in which a representation of a word or a plurality of words is normalized.

5. An alignment generation device comprising:
a memory configured to store a plurality of sentences in a first language and a plurality of sentences in a second language, each of which is associated with each of the plurality of sentences in the first language; and
a processor coupled to the memory and the processor configured to
generate a first plurality of encoded sentences by encoding, in accordance with prescribed units, the plurality of sentences in the first language,
generate a second plurality of encoded sentences by encoding, in accordance with the prescribed units, the plurality of sentences in the second language, and
generate relationship information indicating relationships between a first plurality of codes in the first plurality of encoded sentences and a second plurality of codes in the second plurality of encoded sentences, in accordance with a number of combinations of a first code included in a third plurality of codes and a second code included in a fourth plurality of codes, the combinations of the first code and the second code being included in a first plurality of combinations of each of the third plurality of codes and each of the fourth plurality of codes, the first plurality of combinations being generated for each of a second plurality of combinations generated by selecting each of the first plurality of encoded sentences and each of the second plurality of encoded sentences, the third plurality of codes being included in the selected first encoded sentence and the fourth plurality of codes being included in the selected second encoded sentence.

6. The alignment generation device according to claim 5, wherein the first code is associated with the second code.

7. The alignment generation device according to claim 5, wherein the processor is configured to:
generate first index information having a logical value indicating whether each of the first plurality of codes is included in each of the first plurality of encoded sentences;
generate second index information having a logical value indicating whether each of the second plurality of codes is included in each of the second plurality of encoded sentences; and
generate the relationship information in accordance with the first index information and the second index information.

8. The alignment generation device according to claim 5, wherein the prescribed units correspond to a string in which a representation of a word or a plurality of words is normalized.

9. An alignment generation method comprising:
generating, by a processor, a first plurality of encoded sentences by encoding, in accordance with prescribed units, a plurality of sentences in a first language;

generating, by the processor, a second plurality of encoded sentences by encoding, in accordance with the prescribed units, a plurality of sentences in a second language, each of which is associated with each of the plurality of sentences in the first language; and
generating, by the processor, relationship information indicating relationships between a first plurality of codes in the first plurality of encoded sentences and a second plurality of codes in the second plurality of encoded sentences, in accordance with a number of combinations of a first code included in a third plurality of codes and a second code included in a fourth plurality of codes, the combinations of the first code and the second code being included in a first plurality of combinations of each of the third plurality of codes and each of the fourth plurality of codes, the first plurality of combinations being generated for each of a second plurality of combinations generated by selecting each of the first plurality of encoded sentences and each of the second plurality of encoded sentences, the third plurality of codes being included in the selected first encoded sentence and the fourth plurality of codes being included in the selected second encoded sentence.

10. The alignment generation method according to claim 9,
wherein the first code is associated with the second code.

11. The alignment generation method according to claim 9,
wherein the encoding of the plurality of sentences in the first language includes generating first index information having a logical value indicating whether each of the first plurality of codes is included in each of the first plurality of encoded sentences,
the encoding of the plurality of sentences in the second language includes generating second index information having a logical value indicating whether each of the second plurality of codes is included in each of the second plurality of encoded sentences, and
the generating of the relationship information is executed in accordance with the first index information and the second index information.

12. The alignment generation method according to claim 9,
wherein the prescribed units correspond to a string in which a representation of a word or a plurality of words is normalized.

13. A non-transitory computer-readable recording medium having stored therein a translation program that causes a computer to execute a process comprising:
generating first encoded text data by encoding, in accordance with prescribed units, text data in a first language;
translating the first encoded text data into second encoded text data in accordance with relationship information indicating relationships between a first plurality of codes in a first plurality of encoded sentences generated by encoding, in accordance with the prescribed units, a plurality of sentences in the first language and a second plurality of codes in a second plurality of encoded sentences generated by encoding, in accordance with the prescribed units, a plurality of sentences in a second language; and
generating text data in the second language by decoding the second encoded text data,
wherein the relationship information is generated in accordance with a number of combinations of a first code included in a third plurality of codes and a second code included in a fourth plurality of codes, the combinations of the first code and the second code being included in a first plurality of combinations of each of the third plurality of codes and each of the fourth plurality of codes, the first plurality of combinations being generated for each of a second plurality of combinations generated by selecting each of the first plurality of encoded sentences and each of the second plurality of encoded sentences, the third plurality of codes being included in the selected first encoded sentence and the fourth plurality of codes being included in the selected second encoded sentence.

* * * * *